D. A. CLARK & C. E. LOWE.
TIRE CORE.
APPLICATION FILED OCT. 22, 1917.
1,273,032.
Patented July 16, 1918.
6 SHEETS—SHEET 5.
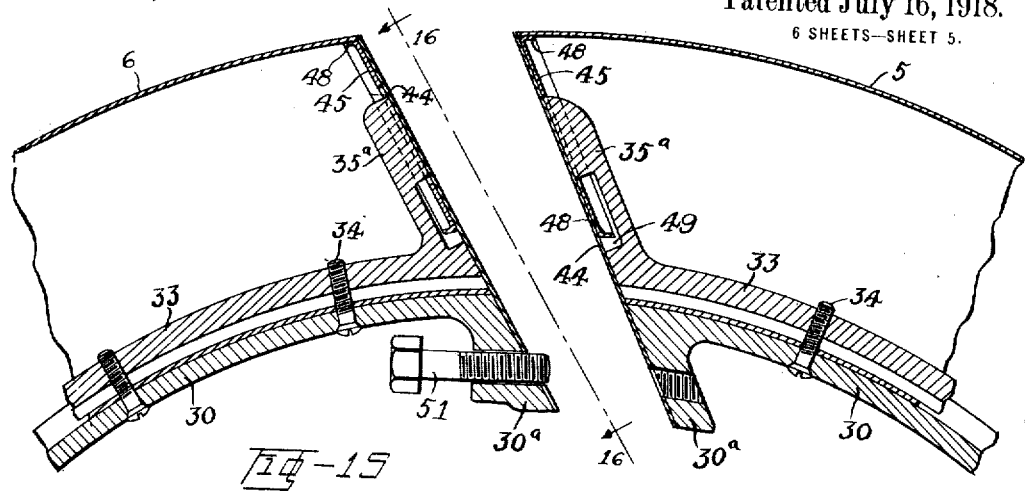
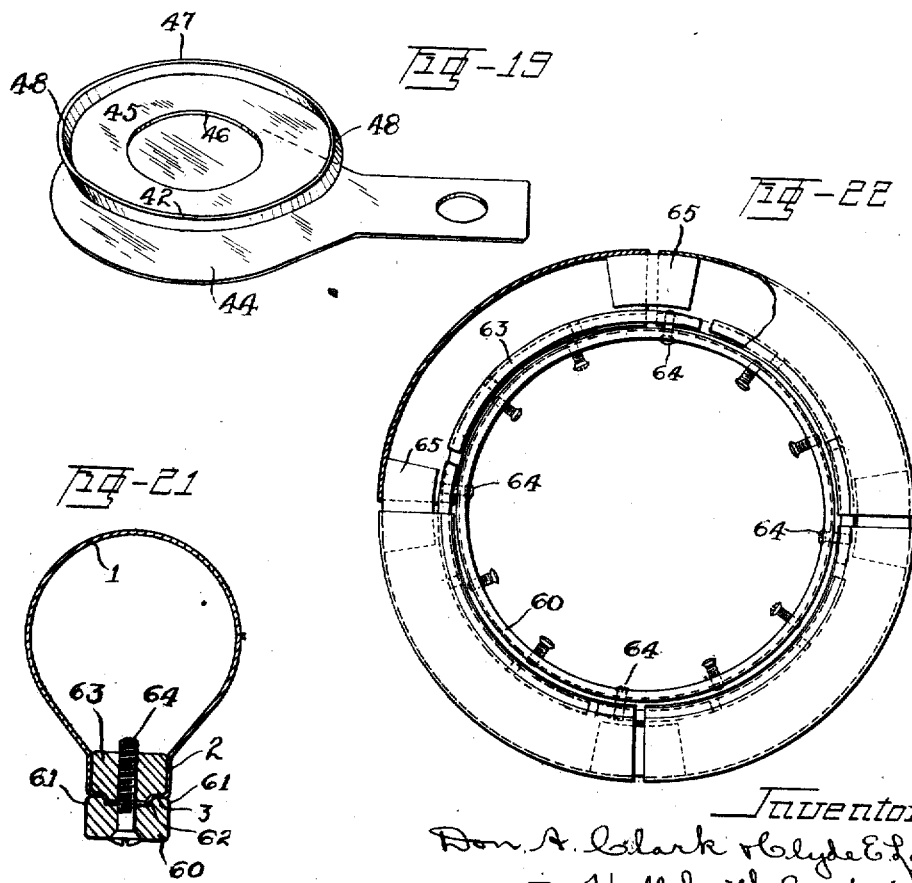
Inventors
Don A. Clark & Clyde E. Lowe
By Hull, Smith, Brock & West
Attys

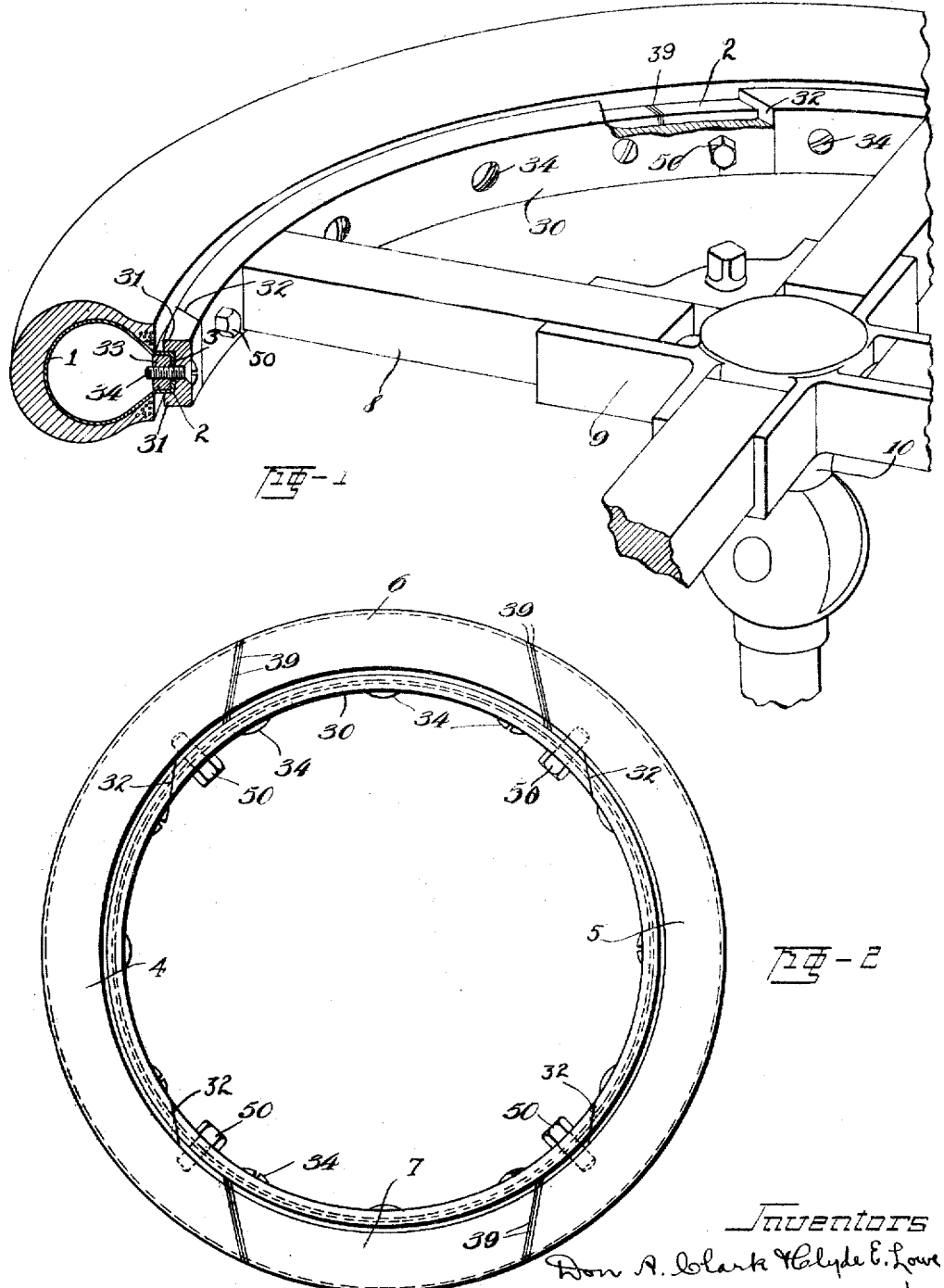

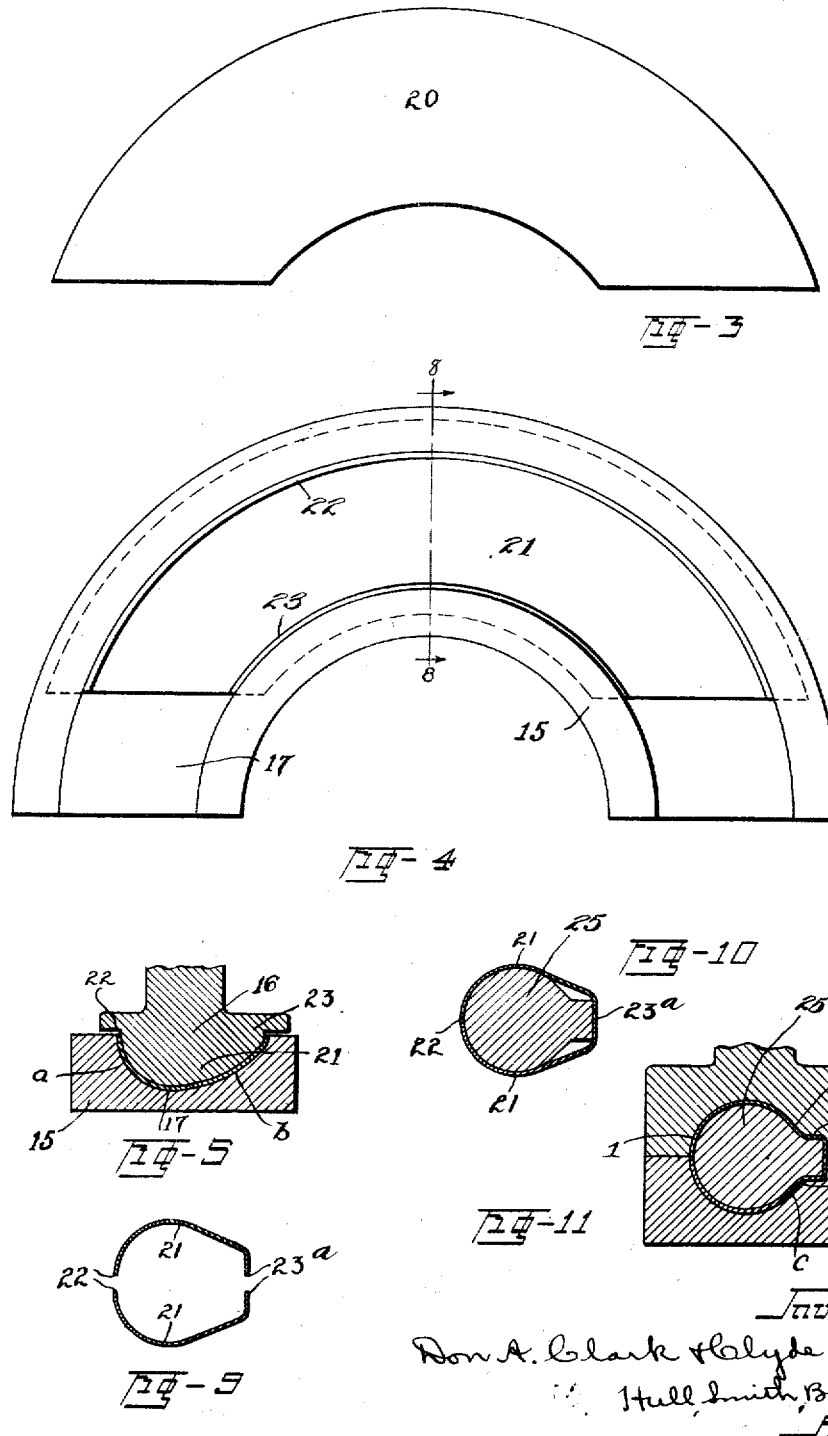

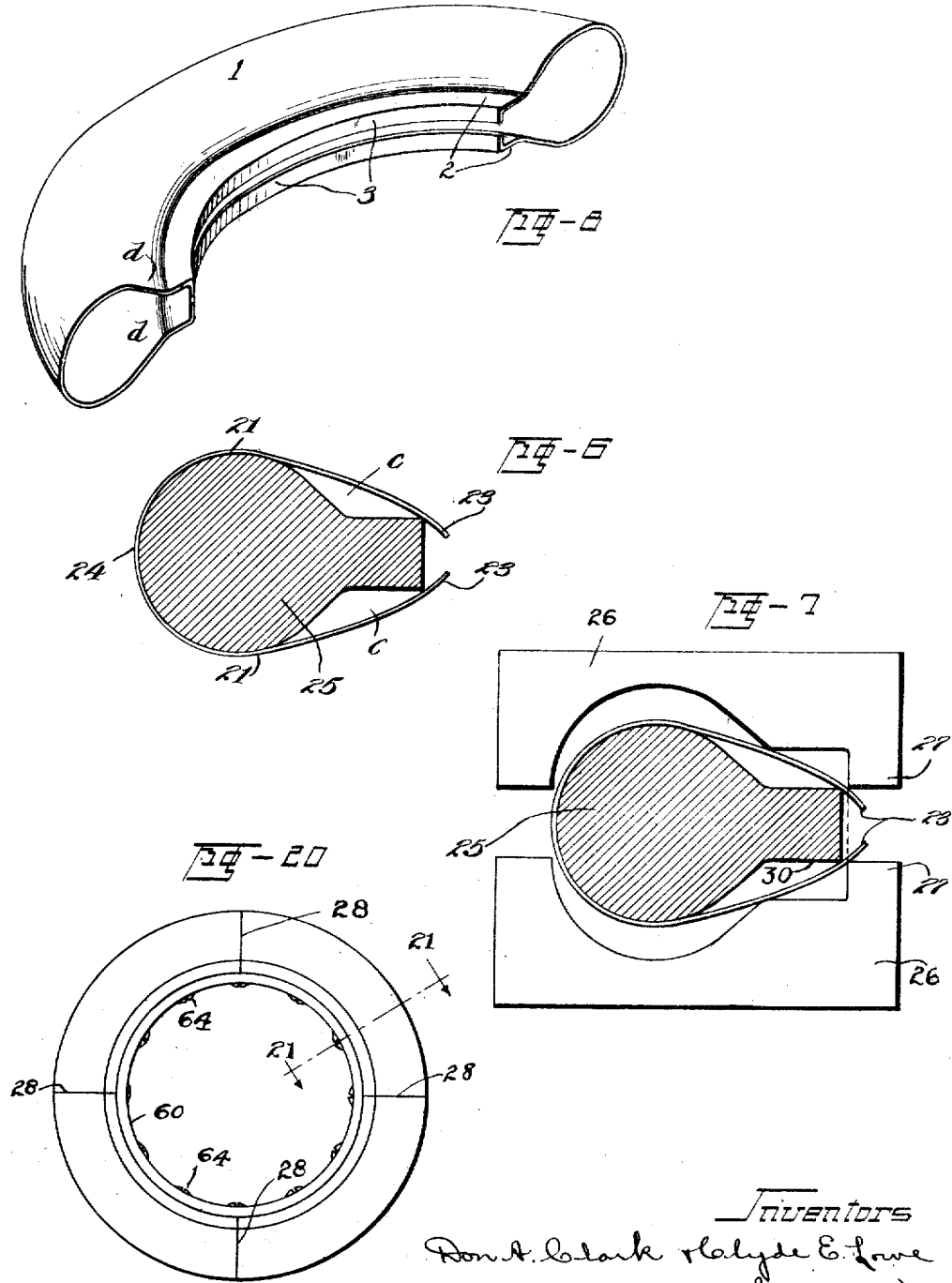

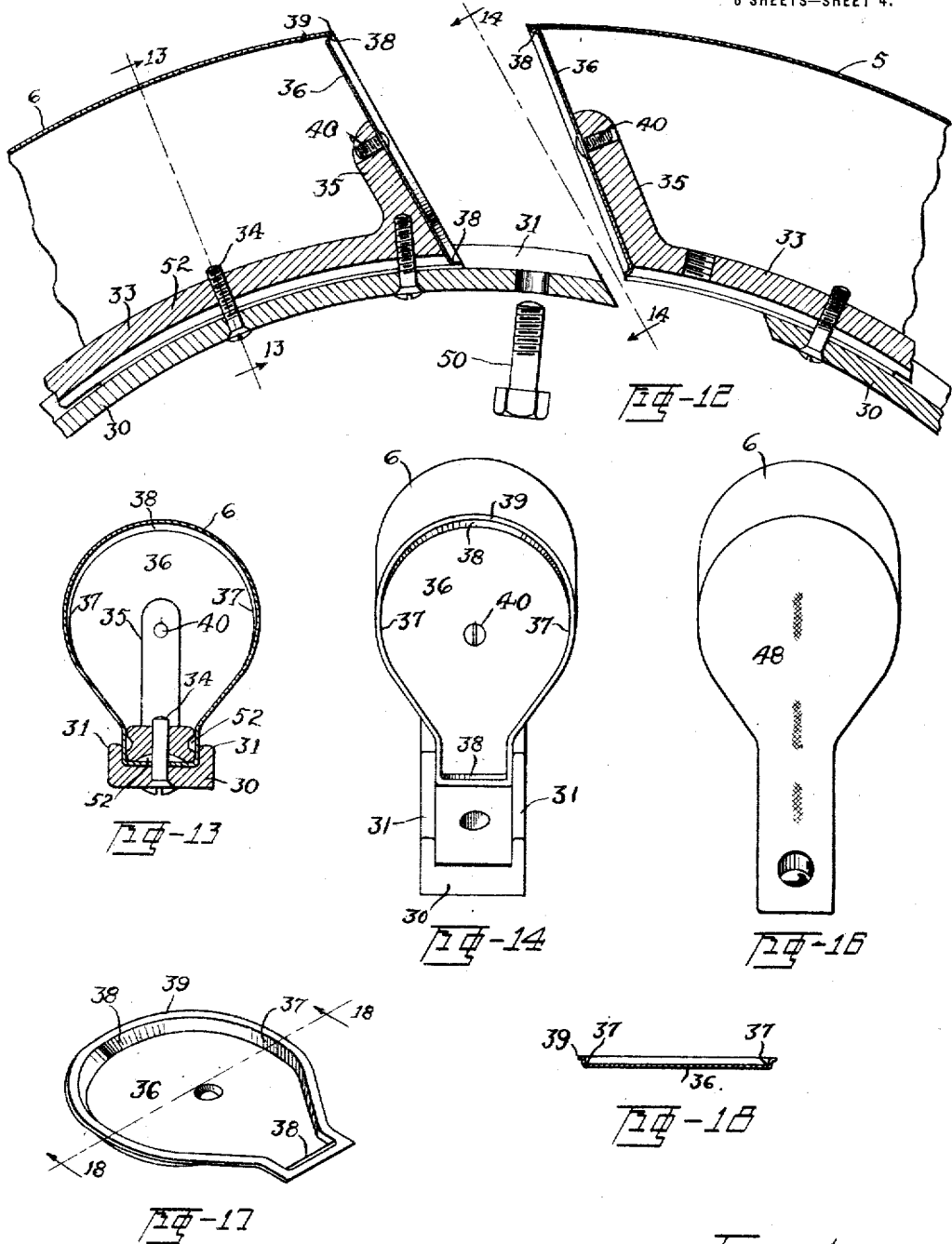

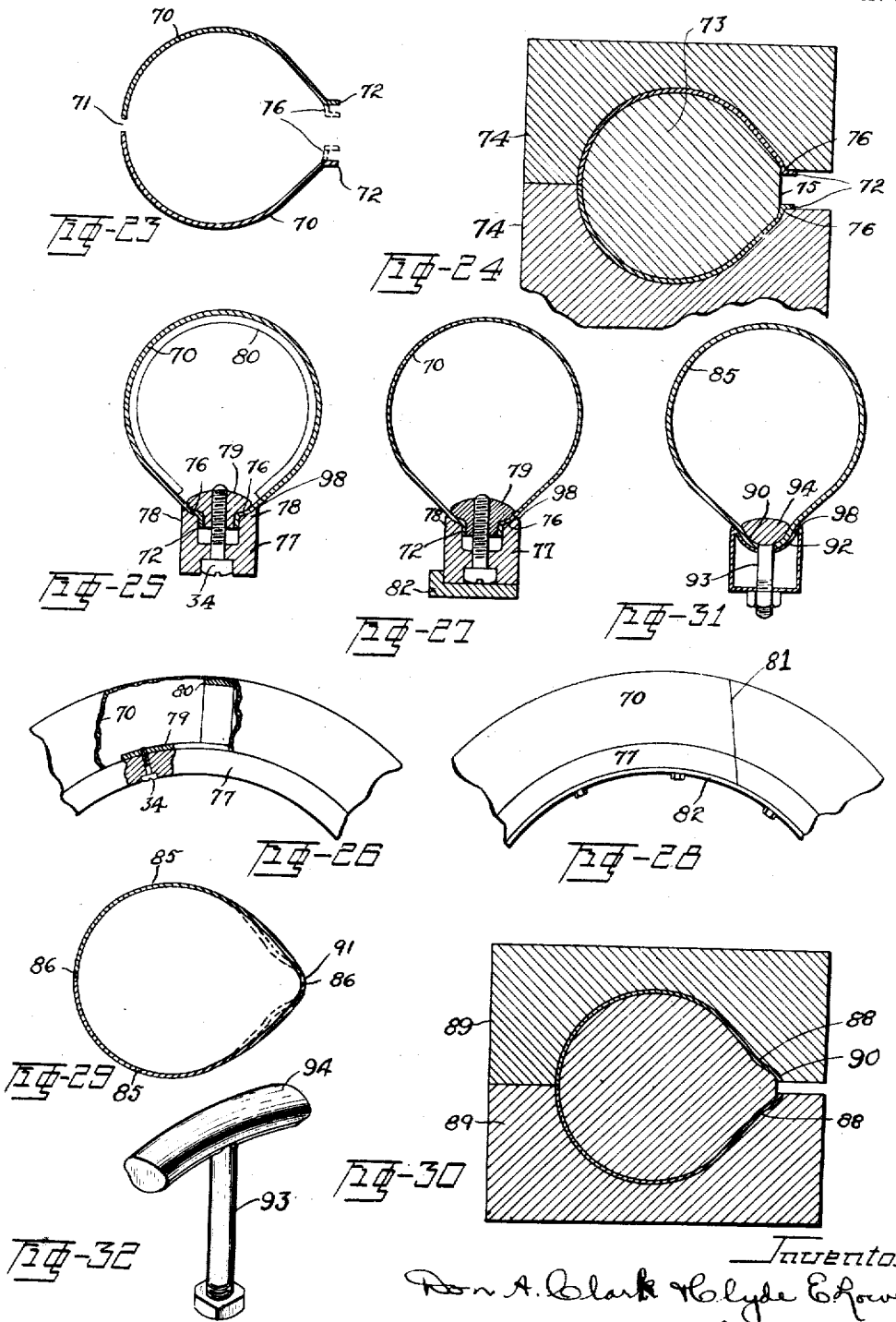

UNITED STATES PATENT OFFICE.

DON A. CLARK, OF WILLOUGHBY, AND CLYDE E. LOWE, OF EAST CLEVELAND, OHIO, ASSIGNORS TO THE CLYDE E. LOWE COMPANY, OF CLEVELAND, OHIO, A CORPORATION OF OHIO.

TIRE-CORE.

1,273,032.   Specification of Letters Patent.   Patented July 16, 1918.

Application filed October 22, 1917. Serial No. 197,785.

*To all whom it may concern:*

Be it known that we, (1) DON A. CLARK, (2) CLYDE E. LOWE, citizens of the United States, residing at (1) Willoughby, (2) East Cleveland, in the county of (1) Lake, (2) Cuyahoga, and State of (1) Ohio, (2) Ohio, have invented a certain new and useful Improvement in Tire-Cores, of which the following is a full, clear, and exact description, reference being had to the accompanying drawings.

This invention relates to a new and improved core for use in the manufacture of pneumatic tires and has for its object the provision of a core of cheaper construction and less weight than any heretofore in use, whereby the manufacture of tires can be greatly cheapened by reason of the less expense of the mechanism and greatly facilitated because of the reduction in weight to be transported, as well as considerably expedited because of the smaller heat-capacity of the parts. Further objects of the invention are: the provision of a process whereby these cores and similar articles can be manufactured from sheet metal; the provision of new, useful, and ingenious expedients for securing together and supporting the adjacent ends of the sections, whether for a collapsible or integral core; the provision of new and useful means for closing and stiffening the ends of sectional core parts; the provision of new, useful, and ingenious means for supporting hollow, sheet metal bodies of appropriate shape in circular formation to produce commercial tire-cores; the provision of sectional tire-cores wherein the sections are interchangeable; while further objects and advantages of the invention will become apparent as the description proceeds.

In the manufacture of pneumatic tires the interior of the outer casing or "shoe" is formed upon a core of suitable cross section, the body or carcass of this casing being laid thereon either by hand or machine. This core is of annular shape and the tire body is built thereon in the form of an endless ring, the core being meanwhile mounted upon a rotatable hub or supporting chuck in any suitable manner. After the various plies or layers of the tire have been applied in the desired manner the core together with the incomplete article is transferred to the curing ovens for the curing processes, which vary somewhat with different manufacturers but are similar in that they all contain the employment of heat. After the termination of the curing the parts are allowed to cool and the core removed. In casings having soft or clencher beads the cores are made in one piece (at least in the smaller sizes) and the tire is removed by rolling or stretching thereover; in the case of straight-wall tires wherein the beads are rendered inextensible by the use of embedded wires or cables it is necessary to employ collapsible cores which can be removed in sections, this being also done in the case of soft-bead tires of large size.

Heretofore it has been necessary to make these cores out of cast metal in order to secure the necessary accuracy. The manufacturing tolerance, in the case of handmade, air cured tires, is as great as plus or minus twenty one-thousandths of an inch, but in machine-made, mold-cured tires this tolerance is only plus or minus four one thousandths inch. In the case of a four inch, mold-cured tire a variation between two cores of .004 inch will entail a difference in rubber cost of approximately one dollar, at present rubber prices. The construction of these cores of cast metal necessitates a considerable thickness of wall in order to secure good castings of the requisite strength, which renders the device extremely heavy; and in addition each core has to be turned in a boring mill to a rather smooth surface not only to afford the requisite uniformity to the diameter but to prevent the tire fabric from adhering thereto. The machine work and amount of metal thereby required occasion great expense, particularly when one considers the tremendous number of cores required by a tire factory wherein so many cores are all the time tied up in process. In addition the handling of these heavy cores and their transportion from place to place in the factory presents an extremely difficult problem. Moreover the construction of segmental cores in cast metal is so extremely expensive and their weight is so much greater than that of integral cores that the cost of tires made thereon has hitherto been decidedly higher than that of tires made on integral cores, this one item being largely responsible for the difference. Finally the corresponding segments of different cast iron cores are not interchangeable, which fact necessitates great care in keeping the different segments together, and further results in the loss of the entire core in case a single segment becomes injured or misplaced as frequently occurs in the confusion of a large factory.

Numerous attempts have been made to construct a core from sheet metal, since a successful core of this material would require no machine work and hence be far cheaper than the customary cast core, (less than one-fourth when made in large quantities); the difference in cost between the continuous core and the segmental core would be almost entirely obviated so that straight side tires would cost little, if any, more than soft bead tires, and the soft bead tires themselves could, if desired, be made on collapsible cores; and, most important of all, the weight of each core would be reduced about 80%, greatly facilitating and cheapening the production of all tires. Heretofore the cores made from sheet metal have been weak, flimsy, irregular and so far outside of the tolerance limitations as to be worthless. Our invention provides a method whereby these cores can be made with all the rigidity and strength of the cast metal and well within the tolerance limits, together with improved means of stiffening, reinforcing, and assembling the same whereby these advantages are preserved.

In the drawings accompanying and forming a part of this application we have illustrated only a few out of numerous mechanisms in which my invention can be embodied and our improved process performed. In these drawings Figure 1 represents partly in section and partly in perspective a tire core supported in its operative position and having a partially completed tire thereon; Fig. 2 is a plan view of a completed core of the sectional type constructed in accordance with our invention and ready for the reception of the tire; Fig. 3 is a plan view of one of the blanks from which a core section is made; Fig. 4 represents a plan view of the female die employed in making the core sections; Fig. 5 represents a cross sectional view of the die together with the punch employed therewith; Fig. 6 represents a cross sectional view of the forming mandrel with the partially formed blank in place thereon; Fig. 7 represents the forming dies at the beginning of their forming stroke upon the assemblage illustrated in Fig. 6; Fig. 8 is a perspective view of the sheet metal section after the operation indicated in Fig. 7; Fig. 9 illustrates two blanks of slightly modified form presented to each other prior to welding; Fig. 10 illustrates the last mentioned parts welded together and the mandrel inserted; Fig. 11 illustrates the last mentioned parts inside the forming dies at the instant of the completion of the forming stroke; Fig. 12 is a longitudinal sectional view of the abutting ends of two core sections shown in Fig. 2, said sections being shown slightly separated; Fig. 13 is a sectional view taken on the line 13—13 of Fig. 12; Fig. 14 is a plan view taken on the line 14—14 of Fig. 12; Fig. 15 is a view similar to Fig. 12 showing a slightly modified construction; Fig. 16 is a plan view taken as indicated by the line 16—16 in Fig. 15; Fig. 17 is a perspective view of the end closure shown in Fig. 12; Fig. 18 is a cross sectional view of said closure taken on the line 18—18 of Fig. 17; Fig. 19 is a perspective view of the parts constituting the end closures shown in Fig. 15; Fig. 20 is a plan view of an integral core constructed in accordance with our invention; Fig. 21 is a cross-sectional view of the same taken on the line 21—21 of Fig. 20; Fig. 22 is a detail view partly in section showing the method of assembling the core shown in Fig. 20; Fig. 23 illustrates two blanks of another modified form, the full lines indicating the shape given by the first or rough dies and the dotted lines showing the form to be given by the finishing dies; Fig. 24 illustrates the finishing dies at the moment of completing the finishing stroke upon the blank shown in Fig. 23; Fig. 25 illustrates the preferred mode of supporting the sections shown in Figs. 23 and 24 to form an integral core; Fig. 26 is a side view of a part of the core illustrated in Fig. 25, part of the same being shown in section; Figs. 27 and 28 are views similar to Figs. 25 and 26 showing one method of forming and assembling a segmental core from the parts there shown; Fig. 29 illustrates a still further modification of blank; Fig. 30 the shape to which it is finished; Fig. 31 a cross section of a core made from this last segment; and Fig. 32 a perspective illustrating a modified design of filler member.

According to present established practice a tire core consists of a substantially torus-shaped body, having a transversely rounded part 1 and an inwardly projecting rectangular part or rib 2 formed with flat sides. The tire-casing is built upon the rounded portion by laying thereon the necessary plies of fabric, cord, rubber, etc., the edges being cut by a knife along the line defined by the junction of these flat and rounded portions. The flat portion or rib constitutes a means of support and also of gaging the distance between the tire beads.

In use the core is supported in some convenient manner, such, for example, a shown in Fig. 1 where the rib is attached to the expanding spokes 8 of a chuck 9, pivoted upon an adjustable spindle 10, whereby the device can be set in any convenient position for manipulation. In this connection we have illustrated one of our sectional sheet metal cores, but it will be understood that we do not limit ourselves to sectional cores or to any one method of mounting, since either this core or any other core herein shown can be mounted and manipulated either in this or any other way known to the art.

According to our invention the rib may either be made from sheet metal and integral with the rounded portion, as shown in Figs. 1 to 19 inclusive; or it may be partly of sheet metal integral with the rounded portion, as shown in Figs. 20, 21, and 22, the remainder being a separate part; or it may be wholly separate from the rounded, sheet metal part as shown in Figs. 23 to 32 inclusive and may be either of rolled metal, cast metal, or sheet metal.

First describing by reference characters the construction wherein the rectangular rib is made of sheet metal and integral with the rounded portion, a plurality of arcuate hollow sheet metal bodies are formed, each having a rounded portion 1 merging with the flat parallel side walls 2, 2, the latter terminating in the inturned lips 3, 3. For forming these hollow bodies we provide, first, curvilinear die members consisting of a receiving member 15, and an entering member 16, said members preferably subtending 180° of arc and the receiving member having therein a semi-arcuate groove 17. This groove follows the contour of the completed body only approximately, the portion $a$ which lies adjacent the outer periphery of the groove preferably conforming rather closely to the ultimate shape of the body, and the portion $b$ being substantially tangent to this largest portion instead of parallel to its plane as in the completed device. The sheet metal is preferably stamped to the approximate size and shape necessary, as shown at 20, before being drawn with these dies, enough metal being provided so that, when positioned as shown in dotted lines in Fig. 4 and struck as shown in Fig. 5, a channel shaped blank 21 will be produced having its outer edge 22 approximately flush with the die surface. Of course a larger sheet can be employed and a flange produced to be afterward cut off in a shearing die, but this involves a waste of metal, and the slight irregularity of the edges produced in the drawing operation is not detrimental since it lends itself in a satisfactory manner to the subsequent welding.

In the preferred employment of the invention, the inner margin of the blank is curved approximately to the shape shown at 23 in Figs. 6 and 7, though this is not imperative as will be shown hereafter.

Two identical blanks 21, 21 are then seam-welded together as shown at 24, after which a mandrel 25 of the exact size and shape desired is inserted longitudinally therein. This mandrel preferably subtends an arc of 180° and its insertion is much facilitated by having the inner edges of the body slightly spread apart as shown. The ends of the mandrel generally project beyond the blank and the grooved sides of the mandrel are spaced from the walls of the blank as shown at $c$, in Fig. 6. This mandrel together with the sheet metal body thereon is now placed between a pair of forming dies 26, 26, whose acting surfaces are fashioned to the identical shape and size of the completed core. These forming dies also preferably subtend an angle of 180°, being conveniently formed by turning in a lathe a single piece of metal so as to form a complete groove, after which the metal is sawed asunder so that the two halves will be identical. When the two die-members are forced together, the metal body therewithin is caused to conform exactly to the mandrel. The inner margins of the dies are formed with lips 27, 27 whose function is to turn inwardly the margins 23, 23 and grip the same around the shoulder of the mandrel against slipping movement. The continued approaching movement of the dies then stretches the metal in a radial direction all the way around the mandrel on each side at the points indicated by $d$—$d$, so that the same is left in a state of tension. Upon separating the forming dies and withdrawing the mandrel the hollow body appears as shown in Fig. 8.

Numerous modifications may be made in the method of forming this body so long as they all provide an actual stretching of the metal whereby it is left in a state of mechanical tension. For example, one such modification is illustrated in Figs. 9, 10 and 11, wherein the lips at the inner edges of the blanks, instead of being turned merely to the oblique angle shown at 23, 23 in Figs. 6 and 7, are turned abruptly inwardly as shown at 23$^a$, and welded together simultaneously with the welding of the opposite margins, notches being provided therein from point to point to permit the passage of bolts. A mandrel 25 of exactly the same type is employed in the previous case, as well as forming dies 26, 26 whereby the necessary stretching of the metal is produced. This modification is slightly less convenient than the preceding owing to the added welding necessary and to the greater difficulty of inserting and withdrawing the mandrel but is entirely feasible.

By either one of these processes we have been able with merely the usual manufacturing precautions to make hollow bodies varying less than two one-thousandths of an inch, which is much less than the usual manufacturing tolerance with cast cores. The mechanical stretching of the metal imposes thereon a continuous strain which imparts to the finished article a hardness and rigidity comparable to that formed in the cast article by the cooling strains. This stretching also overcomes the tension originally presented in the plates from the rolling mill which ordinarily causes them to warp or "wind", and also obliterates the warping induced by the welding operation, which is frequently very pronounced. We consider it of importance that the blank be stretched and formed by a single blow, in order that all of these tension strains may be set up at the same time, and further that no subsequent operations, either of heating or deformation, be performed which shall release the tension effect produced by this step, or superpose irregular or unequal strains which would have a deforming tendency. For this reason, no welding of the sheet metal parts is afterward possible, no riveting is permissible, and even the formation of apertures is attended with some risk and must be performed with care. Accordingly in attaching different bodies together to form a completed core, either of the continuous or segmental variety, due precautions must be taken, as will now be pointed out.

We will first describe the preferred method of finishing these bodies and securing them together to produce a collapsible core such as shown in Figs. 1, 2, 12, and 15. In this structure four separable segments are preferably employed, the side members 4 and 5 having their opposite ends in converging planes oblique to the radii and the intermediate segments 6 and 7 having their opposite ends formed upon similarly inclined planes and fitting snugly against the end faces of the other members as illustrated at 8, 8. The ends of the bodies are cut to the proper angle by carefully sawing them so as not to deform the sheet metal. So long as the angle is such as to permit the ready collapse of the core its exact value is immaterial, except that similar segments should always be cut to the same length and at the same angle for purposes of interchangeability.

A continuous rigid ring 30 of steel or cast iron is then turned to exactly circular shape and provided upon its exterior with side flanges 31 defining an annular channel of the exact width necessary to receive the rectangular flat walled portion 2 which distinguishes the inner portion of the core. This ring is then severed at four points by the saw scarfs 32 whose angle is substantially that between the adjacent segments. Inside each hollow body is introduced an arcuate filler 33 of rectangular cross section and exactly filling the rectangular portion. These filler members are also preferably made by turning to shape a single integral ring which is later sawn asunder at the required points. These filler members are secured to the respective sections of the ring 30 by means of radial screws 34 passing through the slot between the two lips, in the case of a body of the type shown in Fig. 8, or passing through the spaced notches left for the purpose in the case of the bodies shown in Figs. 10 and 11. Each end of each filler member 33 is formed with an outwardly turned head 35 whose face lies parallel to and generally slightly within the plane defined by the end of the segment, and to this face is preferably attached a closure plate which prevents the entrance of foreign matter inside the core and also greatly strengthens and stiffens the free edges of the segments.

We are not certain that such a closure plate is invariably necessary in all cases and hence do not confine ourselves to its use, but it appears to be extremely desirable, and may be made in several ways. The cheapest construction of the same that has yet occurred to us is that shown in Figs. 12, 14, 17 and 18 wherein a flat sheet of metal is formed between dies to substantially the shape shown, including a flat bottom 36 provided with a continuous integral rim whose wall is substantially perpendicular at the two sides 37, 37 and inclined at the inner and outer portions 38, 38 by an amount substantially equal to the angularity of the end of the segment. The top of this rim is formed with a flat outwardly projecting lip 39 which overlies the end of the segment to which it is attached and forms a seat for the similar lip of the closure plate of the abutting segment as shown in Fig. 2. This one plate can be applied to either end of any segment, the square walls 37 fitting into the sides of the body and the inclined portions fitting snugly against the body wall on the one side, and retreating from it at the opposite side. The dished shape of the closures affords space for the heads of the screws 40 whereby the same are secured to the heads 35, 35.

In case it be desired to construct the closure plate with still greater care so as to secure a bracing action at every point upon the core wall, the expedient illustrated in Figs. 15, 16 and 19 can be employed, in which the closure consists of a perfectly flat sheet of metal 44 of the exact shape and size of the interior of the core at the junction point, and the bracing and entering portion consists of a separate piece attachable to the face of said plate. This separate piece consists of an elliptical blank 45 having a sizable central opening 46 and an upturned marginal rim whose lateral portions 47, 47 are upturned at right angles and whose apical portions 48, 48 are turned one inwardly and the other outwardly by an angle equal to that between the end of the core section and its radius. If this inner plate be attached in the one position it will fit into one end of the core exactly while if turned to the opposite position it will fit the other section end with equal snugness. We have shown the head 35ª as formed with a notch 49 for the reception of this lip, and we have also indicated a different method of securing the plate to the attaching face, namely welding or soldering, since it is believed that this can be effected upon this elongated head without transmitting such heat to the core walls as to draw their temper. With either type of closure it is generally necessary to finish the edges by hand filing after the closure is in place.

Various methods may be employed for securing together the ends of these segments. One expedient consists in forming the saw scarfs 32, 32 at points out of alinement with the section ends, whereby projecting tongues are left which may be secured by means of bolts 50, 50 to the sections which they overlap. Another expedient is to form the interior of the ring 30 with inwardly projecting lugs 30ª, 30ª through which the saw scarf passes, these lugs being apertured for the reception of a tangent bolt 51 whereby they are held together. We have shown these lugs 30ª, 30ª in conjunction with a closure plate 44 which extends entirely thereover, thus forming a uniform seat, but this is another detail which may be varied. For purposes of lightness we have shown the filler member 33 as formed with longitudinal grooves 52, 52 which is also clearly a variable detail. It will be noted that in Fig. 12 we have shown bodies constructed with the open slot illustrated in Fig. 3, and in Fig. 15 we have shown bodies constructed with the internal weld illustrated in Figs. 10 and 11.

We will next describe the construction from our improved sheet metal bodies of an integral or non-collapsible type of core, and likewise as to this it will be understood that numerous subsidiary modifications may be adopted. The ends of the blanks are first cut at the desired angle, generally a right angle as shown at 28 in Fig. 20. We have shown the core as made up of four sections, which is the preferred construction, although a larger or smaller number could be employed.

A continuous rigid ring 60 of steel or cast iron is turned to exactly circular shape and provided upon its exterior with side flanges 61 defining an annular channel, (see Fig. 21). In the present embodiment we have shown the ring 60 as having the same width as the rectangular portion 2 of the core, owing to the fact that some kinds of tire machinery are best suited by a structure of this nature, although it will be understood that a ring of the exact shape shown in Fig. 13 could be employed if desired. The inwardly turned margins 3 of the sheet metal bodies are formed with lips 62 which engage the inner faces of the flanges 61—61. The rectangular portions 2 are occupied by arcuate filler members 63 shaped complementary to the adjacent faces of the ring 60 and secured thereto by radial screws 64. The adjacent ends of the sheet metal bodies are bridged by hollow coupling sleeves 65, in addition to which the filler members also preferably bridge the gaps between the adjacent sections. Fig. 22 illustrates an intermediate step in assembling an integral or one piece core constructed in accordance with our invention, from which it will be seen that the filler members 63 and connecting sleeves 65 are first inserted in place and the core members approached part way toward each other. The ring 60 is next inserted within the core (the core members being hitherto left sufficiently apart to permit this) and each of the filler members attached loosely to the ring by means of one of the screws 64. The entire core is now put in a contracting chuck whereby the sections are forced into close engagement with each other and with the surface of the ring 60, whereupon the remaining screw-holes will have been brought into alinement with their respective screws after which it is a simple matter to finish the assembling.

In both the integral and the collapsible types of core the continuous clamping of the sheet metal members against the rigid metal ring affords the necessary security without any deforming tendency, but rather the reverse. The curvilinear portion of the major part of the core inherently possesses great strength, especially toward inward pressure, while the filler member affords an equal strength to the rectangular rib which would otherwise be a point of weakness. The type of ring shown in Fig. 21 can be used on the collapsible type of core and the ring section shown in Fig. 13 upon the integral type of core if desired, although we prefer the arrangement shown herein for two reasons, first that the deeper side flanges 31 are somewhat better suited to the purpose of a collapsible core than the shallower flanges 61, owing to their greater embracing effect which partly offsets the greater structural weakness of the collapsible construction; while the shallower flanges 61 are better suited to the contracting operation shown in Fig. 22 than the deeper flanges 31 would be. It will be understood, however, that the complete core illustrated in Fig. 20 can if desired be cut in any desired number of sections and so converted into a collapsible core, the parts thereof being subsequently secured together in any well known manner, since various expedients for doing this have grown up in connection with the cast metal type of core.

It will be noted that in the constructions illustrated in Figs. 20, 21 and 22 the rectangular rib is made partly from the sheet metal and partly from the rigid ring to which the sheet metal body is attached. Next describing by reference characters the construction wherein this rib is wholly separate from the sheet metal body, certain embodiments of which construction are shown in Figs. 23 to 32 inclusive. The hollow bodies are preferably made much the same way as heretofore described, namely by first providing two similar arcuate concave blanks drawn to an approximation of the finished form but not completely thereto; next welding said blanks together circumferentially either upon the outside alone or upon both outside and inside; next drawing the blanks to finished form about a suitable mandrel whereby the metal is put under permanent tension strain; and fourth setting said bodies end to end about a rigid ring which both supports the same and forms the rectangular rib.

We will first describe a typical construction including the single weld, reference being had to Figs. 23-27. The sheet metal is first drawn into blanks 70, 70, which are welded together along the line indicated at 71, leaving at their opposite sides the inwardly projecting lips 72, 72. A mandrel 73 is next inserted therein, and the blanks drawn to finished form by the dies 74, 74. This may be effected in a great number of ways, the simplest which we have conceived being to form the mandrel at its portion of smallest diameter with a transverse cylindrical surface 75 past which the lips 72, 72 extend. The dies being also formed with abrupt walls 76, 76 at this point, it will be seen that upon their approach the lips 72 will be displaced bodily toward each other as shown by the dotted lines in Fig. 23 forming offset shoulders 76, 76 which serve the double purpose of forming a seat to engage with the supporting ring and necessitating an actual stretching of the metal which is transmitted over the entire side of the blank.

In order to construct a one-piece of integral core, a circular, endless, rigid ring 77 is provided, the same being formed with a pair of spaced flanges 78, 78 whose outer peripheries are shaped to conform to the portion of the hollow body adjacent thereto and whose inner walls receive the lips 72. A filler member 79 is also provided, its engaging surface being shaped complementarily to the hollow body at the point where it engages the ring. Radial screws 34 are employed to secure the filler members. The meeting ends of the hollow bodies 70 are bridged by a suitable reinforcement 80, here shown as of horseshoe shape and not a complete circle, although one of the previously illustrated types could be used.

In case it be desired to form the last described core into a core of sectional type it is sufficient merely to saw the same completely asunder obliquely as indicated at 81 in Fig. 28, subsequently assembling the various segments together upon the exterior of a supporting ring 82 shown in Figs. 27 and 28.

In Figs. 29 to 31 inclusive we have shown a modification wherein the blanks are welded both internally and externally. The blanks are shown at 85, 85 and the points of welding are indicated at 86, 86. The blanks are preferably originally of a semi-ovate form as shown by full lines in Fig. 29. The mandrel 87 which is thereafter introduced therein is of a size to be inserted within the limits of this blank but is formed upon each side of its portion of smallest diameter with a groove 88, which, upon the operation of the finishing dies 89, 89 shown in Fig. 30, produces an inwardly projecting peripheral bulge 90. Preferably the inner edges of the blanks are formed with notches 91 which, upon the welding, constitute radial apertures for the filler bolts. The hollow bodies thus formed are assembled end to end around a rigid flat sided ring whose exterior surface is formed with a groove 92 to receive the bulge 90. In the present embodiment we have shown this ring as made from sheet metal although it is clear that cast or rolled metal might equally well be used, or that sheet metal might be employed with some of the other constructions heretofore described. Also we have shown in this connection a filler member of somewhat different type, the same consisting of a bolt 93 having an elongated arcuate head 94 shaped to conform to the bulge 90. These heads may either be short or long, and the bolts may either be set so closely together that the heads constitute a practically continuous filler member, or may be set as far apart as convenience indicates. In the same way it will be obvious that previous filler members could be made integral with the bolts, but we apprehend certain advantages in this construction as applied to the core shown in Fig. 31, since the hollow members therein shown are essentially the strongest of any disclosed in this application owing to the simplicity of the outline and to the welding both interiorly and exteriorly. This section also admits of being constructed out of stiffer or thicker metal whereby the necessity of having a filler member to support the same at all points is less pronounced.

It will be noted that each of the last described constructions possesses a groove at 98 which is the junction between the ring and hollow body. This feature also exhibits certain advantages in connection with a tire core since in the practical operation of these devices this is the point where the cutting knife is always applied which in time scours a groove in cast metal and abrades sheet metal.

We are aware that others prior to this time have appreciated the advantages which a sheet metal core would possess and have secured Letters Patent on their prophesies but have never been able to construct their cores with a degree of accuracy which enabled the devices to be used commercially. By our invention we are able not only to make cores of the accuracy necessary for air cured tires, namely a tolerance of about 20/1000 inch, but also of the accuracy necessary for mold-cured tires, namely a tolerance less than 4/1000 inch. Therefore, by virtue of our first successful reduction to practice, we claim the sheet metal core of this degree of accuracy as an article of manufacture. We also claim the process of making the same since, under present knowledge, no other process will serve; but we do not restrict the said process to this article of manufacture and we do not limit our article claims to devices made by this process, since future discoveries may provide other processes; and we do not limit either article or process to the details herein set forth except as recited in the annexed claims. Also, as hereinbefore observed, we claim our improved closures, our improved supporting and assembling features both broadly and narrowly. As used in this specification the word "segmental" means made up of segments, whether collapsible or not; the word "integral" means continuous and not severed, whether made originally of one piece of metal or of many pieces; the words "integral" and "collapsible" are opposed to each other as denoting the two different types of core; the word "rigid" denotes merely mechanical fastness, regardless of whether integral or segmental; the word "blank" denotes a metal product in a primary or intermediate stage of construction; the word "segment" denotes the separable members of a collapsible core; the word "section" refers to the arcuate parts, whether hollow or solid which go to make up the completed core, being sometimes commensurable with "segment" and sometimes not.

Having thus described our invention, what we claim is:—

1. A tire-forming core comprising a series of hollow arcuate sheet metal bodies of requisite cross-section, each having at its portion of least diameter a pair of parallel flanges spaced from each other a distance less than the width of the body; a rigid circular metal ring located between said flanges, and means clamping said flanges to said ring.

2. A tire-forming core comprising a series of hollow arcuate sheet metal bodies, each having the approximate shape of a toric segment and formed with a pair of inwardly projecting flanges spaced from each other a distance less than the width of said bodies, a rigid metal ring located between said flanges, the ends of said bodies abutting so as to form a complete circle, and means mechanically clamping said flanges to said ring.

3. A tire-forming core comprising a series of hollow arcuate sheet metal bodies of requisite cross-section arranged with their adjacent ends abutting, a rigid circular metal ring located inside said bodies adjacent to their portions of smallest diameter, a metal ring located outside the portion of said bodies in which said first ring is contained, and means mechanically drawing said rings together so as to clamp securely the interposed portions of said bodies.

4. A tire-forming core comprising a series of hollow arcuate sheet metal bodies, each having the approximate shape of a toric segment and formed with a pair of inwardly extending spaced flanges, a rigid metal ring located between said flanges, the ends of said bodies abutting so as to form a complete circle, a metal member on the opposite side of each flange from said ring, and means mechanically drawing said ring and member together so as to clamp said flange securely therebetween.

5. A tire-forming core consisting of an approximately torus-shaped sheet metal body having a pair of inwardly projecting spaced flanges, each of which is formed at its inner edge with a continuous inturned lip.

6. A tire-forming core consisting of a plurality of independently formed arcuate hollow sections of sheet metal, each of which has a body shaped like a toric segment and formed with an inwardly projecting integral flange narrower than the body, in combination with a rigid circular ring to which all said flanges are fitted, and tension members mechanically clamping said flanges to said ring.

7. As an article of manufacture, a tire core comprising a series of hollow arcuate sheet metal bodies of requisite cross section bolted to the periphery of a rigid circular ring.

8. As an article of manufacture, a tire core comprising a rigid circular ring and a plurality of arcuate hollow sheet metal bodies rigidly secured to its periphery with their ends abutting, the hollow bodies forming the rounded portion of the core and the ring forming part of the flange portion, the width of said ring being less than the width of said bodies.

9. In a tire core, the combination with a torus-shaped sheet metal segment having an inwardly projecting rectangular rib, of a rigid ring having on its outer periphery a pair of spaced flanges defining an annular channel, and means for clamping said sheet metal segment upon said ring with said flanges engaging said rib in supporting relation.

10. In a tire core, a hollow sheet metal body of approximate torus-shape formed upon its inner periphery with a pair of protruding spaced flanges, a rigid metal ring having upon its outer surface a pair of spaced flanges between which said first flanges are received, an arcuate filler member located inside said body and having its surface shaped complementarily to both said flanges, and means drawing said filler member toward said ring whereby said flanges are clamped.

11. In a tire core, a hollow sheet metal body having the approximate form of a toric segment whose inner surface is slotted, the edges of the slot being bounded by a pair of protruding lips, a filler member inside said body and conforming to the shape of that portion of the same adjacent to said lips and also having a portion extending between said lips, a supporting member conforming to the inner periphery of said body and having a groove receiving said lips, and means securing said filler and supporting member together and clamping said lips and the portion of said body adjacent thereto.

12. In a tire core, a circular supporting ring having a groove on its outer face, a plurality of hollow sheet metal bodies, each having the approximate form of a toric segment, grouped about said ring and abutting at their ends, the walls of said groove conforming to the shape of the portions of said bodies adjacent thereto, a plurality of filler members located inside said hollow bodies and conforming to the shape of those portions of the same which engage said groove-walls, and means securing said filler members to said ring so as to clamp said bodies thereto.

13. In a tire core, a circular supporting ring, a plurality of arcuate, hollow, sheet metal bodies arranged end to end around said ring, segmental filler members inside said bodies and occupying that portion of the same which lie nearest the ring, the abutting portions of said ring, bodies, and members being complementarily shaped, and means securing said filler members rigidly to said ring.

14. In a tire core, a circular supporting ring, a plurality of arcuate, hollow, sheet metal bodies arranged end to end around said ring, segmental filler members inside said bodies and occupying that portion of the same which lie nearest the ring, the abutting portions of said ring, bodies, and members being complementarily shaped, means securing said filler members rigidly to said ring, and means for steadying the abutting ends of said bodies and preventing the ingress of foreign matter.

15. In a tire core, a hollow sheet metal body having the approximate shape of a toric segment and formed with an inwardly projecting hollow rectangular rib, an arcuate rectangular filler member in said rib, a rigid supporting ring, and means for drawing said filler member to said ring to clamp the sheet metal therebetween.

16. A tire core comprising a plurality of toric segments and a supporting ring about which said segments are assembled end to end, each of said segments being of sheet metal and having an inwardly projecting hollow rectangular rib, an arcuate rectangular filler member in the rib of each segment, and means drawing each filler member toward said ring whereby each segment is stiffened and all said segments are held in place.

17. A tire core comprising a plurality of toric segments and a supporting ring about which said segments are assembled end to end, each of said segments being of sheet metal and having an inwardly projecting hollow rectangular rib, and said ring having upon its outer periphery a pair of spaced flanges adapted to engage and support said rib, an arcuate rectangular filler member in the rib of each segment and complementary in shape to said ring, and means for drawing said filler members toward said ring to clamp said rib.

18. In a tire core, a torus-shaped body of sheet metal having an inwardly projecting hollow rib with flat parallel sides, a filler member inside said rib, and a supporting ring to which said filler member is clamped, said ring having at each edge an outwardly projecting flange, one face of which lies in the same plane with the corresponding side of said rib.

19. In a tire core, a circular rigid ring having in its outer surface a groove, a hollow arcuate sheet metal body having its inner part fitting within said groove, a filler member inside said body, and means drawing said member into said groove.

20. In a tire core, a circular rigid ring, a plurality of hollow arcuate sheet metal bodies grouped about said ring, end to end, the abutting ends of said sections meeting upon planes oblique to the radii of the circle and successive planes being inclined in opposite directions, the ring also being severed into a number of sections equal to the number of segments, a filler member inside each segment and rigidly clamped to its corresponding ring section, and means for detachably connecting together the ends of said ring sections.

21. In a tire core, a circular segmental ring, a plurality of hollow arcuate sheet metal bodies arranged end to end around said ring and forming a complete circle, a filler member inside that portion of each sheet metal body which lies adjacent to said ring and rigidly secured to the corresponding ring segment, and a stiffening member entering the end of each sheet metal body and engaging the walls thereof in bracing relation and secured to the corresponding filler member.

22. In a tire core, a circular segmental ring, a plurality of hollow arcuate sheet metal bodies arranged end to end around said ring and forming a complete circle, a filler member inside that portion of each sheet metal body which lies adjacent to said ring and rigidly secured to the corresponding ring segment, and a closure member attached to one end of the filler member and overlapping the end of the sheet metal body and adapted to engage the adjacent member of the core.

23. In a tire core, a circular segmental ring, a plurality of hollow arcuate sheet metal bodies arranged end to end around said ring and forming a complete circle, a filler member inside that portion of each sheet metal body which lies adjacent to said ring and rigidly secured to the corresponding ring segment, and a closure member overlapping the end of each sheet metal body and secured to the corresponding filler member, each closure member having a part entering the sheet metal body and engaging the walls thereof in bracing relation.

24. In a tire core, a circular segmental ring, a plurality of hollow arcuate sheet metal bodies arranged end to end around said ring and forming a complete circle, a filler member inside that portion of each sheet metal body which lies adjacent to said ring and rigidly secured to the corresponding ring segment, and a closure member overlapping each end of each sheet metal body and secured to the corresponding filler member, each closure member having on the one side a part entering the sheet metal body to which it is applied and engaging the walls thereof in bracing relation, and having upon the other side a seating portion adapted to engage the corresponding portion of the adjacent closure.

25. In a tire core, a circular segmental ring, a plurality of hollow arcuate sheet metal bodies arranged end to end around said ring and forming a complete circle, a filler member inside that portion of each sheet metal body which lies adjacent to said ring and rigidly secured to the corresponding ring segment, and a closure member fitted into each end of each sheet metal body and bracing the walls thereof and secured to the corresponding filler member, the outer face of each closure member forming a seat for engaging the closure member of the adjacent core-segment.

26. In a tire core, a circular segmental ring, a plurality of hollow arcuate sheet metal bodies arranged end to end around said ring and forming a complete circle, a filler member inside that portion of each sheet metal body which lies adjacent to said ring and rigidly secured to the corresponding ring segment, and a closure member secured in the end of said sheet metal body and engaging the walls thereof in bracing relation and also adapted to engage the adjacent member of the core.

27. As an article of manufacture a hollow arcuate sheet metal body less than a complete circle in length and constituting a part of a tire core, said body having at its end a bolted closure which reinforces its walls and prevents the ingress of foreign matter.

28. As an article of manufacture a hollow arcuate sheet metal body less than a complete circle in length and constituting a part of a tire core, said body having at each end a closure which overlaps the end of the sheet metal and also fits inside the sheet metal in bracing relation.

29. In a tire core, a hollow arcuate sheet metal section, a closure plate fitting into the end of said section and engaging the walls thereof in bracing relation, and means not including said walls for securing said closure plate in position.

30. In a tire core, a hollow arcuate sheet metal section, a rigid metal member located inside said section and conforming to a portion of the interior thereof and clamped to such portion, and a reinforcing member secured to said rigid member and engaging the walls of said sheet metal section in bracing relation.

31. In a tire core, a hollow arcuate sheet metal body, a rigid metal member located inside said body and conforming to a portion of the interior of said body and clamped to such portion, said rigid member having a bracket, and a reinforcing member secured to said bracket and engaging the walls of said body.

32. As an article of manufacture, a tire core comprising a series of hollow arcuate sheet metal bodies of requisite cross section grouped around a rigid circular ring with their ends abutting, means supporting said ends in mutually engaging relation, and means securing the inner parts of said bodies to said.

33. A tire core comprising a plurality of hollow arcuate sheet metal bodies arranged end to end and forming a complete circle, means engaging the walls and lips of said bodies at their abutting ends for preserving alinement, and a separate member to which all said bodies are secured, whereby they are retained in their relative locations.

34. A tire core comprising a plurality of toric segments and a supporting ring about which said segments are assembled end to end, each of said segments being of sheet metal and having an inwardly projecting rectangular rib secured to said ring, in combination with a supporting and stiffening member inserted into the end of each segment and bracing the walls thereof and engaging the adjacent segment.

35. A tire core comprising a plurality of toric segments and a supporting ring about which said segments are assembled, end to end, each of said segments being of sheet metal and having an inwardly projecting hollow rectangular rib, a filler member located in each rib and extending into the rib of the next adjacent segment, and means for drawing said filler members toward said ring whereby said segments are clamped in position.

In testimony whereof we hereunto affix our signatures.

DON A. CLARK.
CLYDE E. LOWE.